United States Patent [19]

Jiang et al.

[11] Patent Number: 5,757,741
[45] Date of Patent: May 26, 1998

[54] CD ROM HEAD WITH VCSEL OR VCSEL ARRAY

[75] Inventors: Wenbin Jiang, Phoenix; Michael S. Lebby, Apache Junction, both of Ariz.

[73] Assignee: Motorola, Inc., Schaumburg, Ill.

[21] Appl. No.: 582,775

[22] Filed: Jan. 4, 1996

[51] Int. Cl.$^6$ .................................................. G11B 7/095
[52] U.S. Cl. .................... 369/44.12; 369/44.23; 369/121
[58] Field of Search ............... 364/44.12, 44.23–44.24, 364/112, 120–122

[56] References Cited

U.S. PATENT DOCUMENTS

| | | | |
|---|---|---|---|
| 5,483,511 | 1/1996 | Jewell et al. | 369/44.23 X |
| 5,526,182 | 6/1996 | Jewell et al. | |
| 5,621,716 | 4/1997 | Kojima et al. | 369/112 |

*Primary Examiner*—W. R. Young
*Attorney, Agent, or Firm*—Eugene A. Parsons

[57] ABSTRACT

An optical pick-up head for reading information from a data storage medium, the pick-up head including a VCSEL for emitting a beam of light with a focusing element for directing the beam of light onto the data storage medium and a light receiving element for receiving light reflected from the data storage medium and tracking element for positioning the beam.

3 Claims, 5 Drawing Sheets

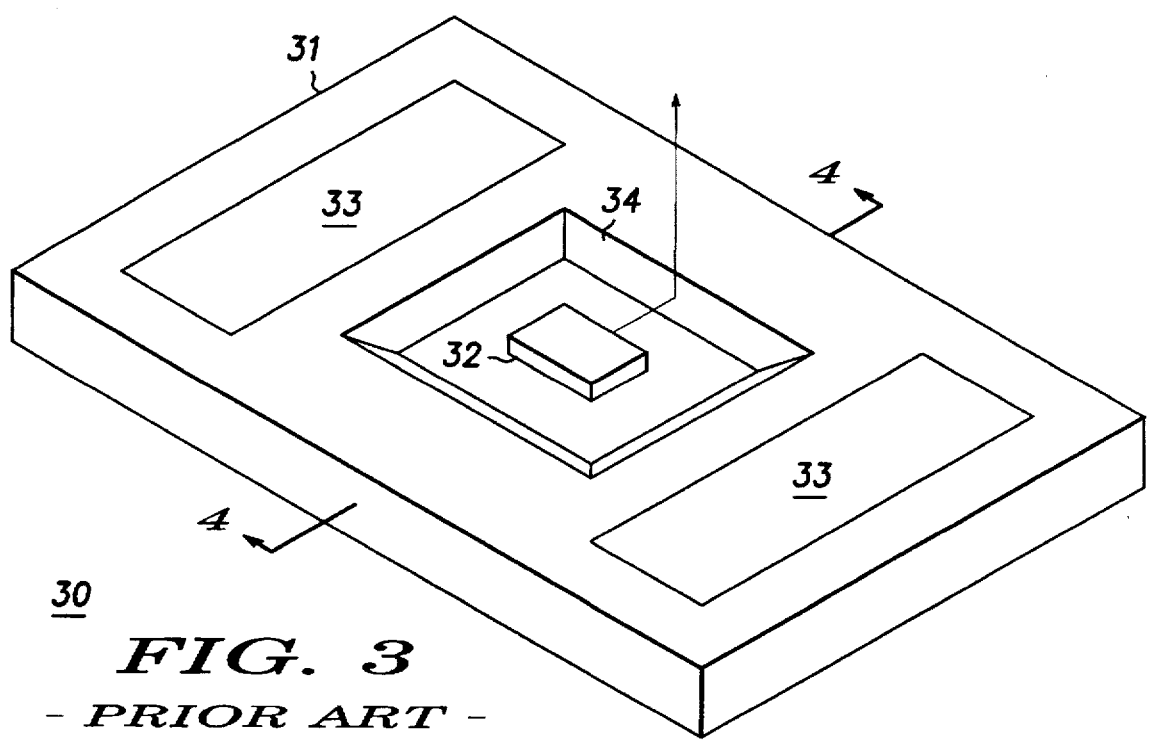
FIG. 3 - PRIOR ART -
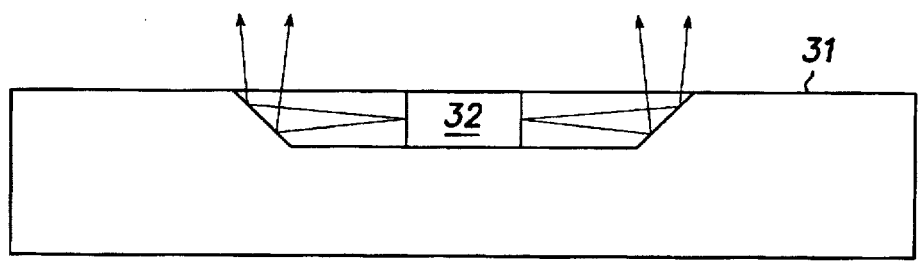
FIG. 4 - PRIOR ART -
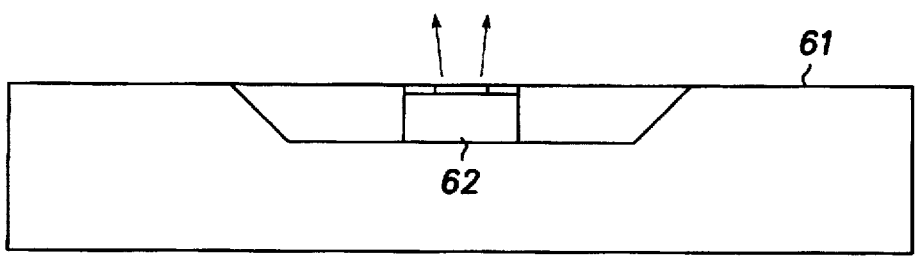
FIG. 7

CD ROM HEAD WITH VCSEL OR VCSEL ARRAY

FIELD OF THE INVENTION

This invention relates to optical reproducing pickup heads.

More particularly, the present invention relates to an optical reproducing pickup head of the type using a semiconductor laser light source.

In a further and more specific aspect, the instant invention concerns improvements in optical reproducing pickup heads for miniaturization.

BACKGROUND OF THE INVENTION

Optical reproducing pickup heads for the reading of stored information on a surface medium such as a compact disk are well known. Exemplary is the conventional pickup head which is generally comprised of a light emitting source and a light transmission and receiving assembly.

Briefly, the light emitting source of a conventional optical reproducing pickup head consists of a typical diode edge emitting laser formed of a semiconductor of the double hetero junction type, for example of GaAlAs (gallium-aluminum arsenide). The diode laser is adapted to emit a laser beam having a cross sectional shape at its emitting position of an elongated rectangle with approximate dimensions of one half of a micrometer by five to ten micrometers in length.

The light receiving assembly consists of a reading mechanism which contains an optical reading head consisting of a solid state laser, with a focusing mechanism having lenses, mirrors, and prisms. Initially, the linear polarized laser beam goes through beam-shaping prisms and is reflected by a polarization beam splitter toward a quarter wavelength plate, and this polarization is then changed into circular polarization by passing the laser beam through this quarter wavelength plate. The laser beam is then directed by a tracking mirror and focused on the disk by the objective lens.

The light is reflected from the disk surface back to the quarter wavelength plate, which further changes the laser beam's polarization back into linear from the circular mode and goes through the polarization beam splitter and is reflected by a critical angle prism, which changes the beams direction at right angles to the projected beam. The light is then directed onto an array of photodiodes. The changes in light intensity through the conductivity mechanism of the photodiodes informs the system of the transition from a pit to a land and vice versa. In operation, the pits scatter the laser beam as the disk rotates, and the lands reflect it. The direction and amount of reflected light change as the disk surface changes from a land to a pit and vice-versa. These changes, detected by the reading optical and electronic devices represent a "one". If the optoelectronic circuit detects no change in the reflected signal, it is interpreted as a series of zeros whose number depends on the length of the pit or land.

The reflected light is not always of uniform and equal distribution on the photodiode array. This change in light intensity allows for focus and tracking adjustments. By calculating the differences between the sums of light intensity in different pairs of diodes, the system can compensate for focus and tracking errors.

A different mechanism can be used to detect tracking errors by utilizing a diffraction grating which splits the laser beam into three parts. The laser beam becomes a main tracking beam with two weaker beams which are focused on the left and right sides of the track to keep the major beam on center.

The compact disk surface reflects the side beams along with the major tracking beam. A separate set of photodiodes are used to detect the tracking error. When the side beams are not of equal intensity, the system activates a servomechanism which moves the optical head to correct the tracking error.

The optical reading head described utilizes a semiconductor laser source of a type known as the edge emitting diode laser. This is a conventional laser used in reading optical heads of compact disk equipment. However, the edge emitting diode has certain limitations when considering miniaturization of the optical head components.

In conventional optical pickup heads, more than six optical components are required for operation. These are the laser diode, a beam splitter, diffraction grating, reflection mirror, objective lens, and photodiode arrays which ultimately interpret the light intensity reflected from the surface of the compact disk. As a result of the quantity of separate components, the optical pick up head becomes thick and large.

An improvement to the conventional optical pick up head is the hologram laser unit which allows for a reduction of discrete components which make up the optical pick up head. The hologram laser unit makes it possible to miniaturize the optical pick up head because it consists of only three optical components. The hologram laser unit consists of a hologram laser unit, a reflective mirror, and an objective lens. In common manufacture, the conventional hologram laser unit consists of the laser diode and photodiode integrated three dimensionally on a copper heatsink. The conventional laser package becomes large and unsuitable for an optical pick up head of a portable compact disk player.

Further improvements were obtained in the miniaturization of an optical pick up head by constructing the laser diode hologram unit on a silicon (Si) photodetector substrate with a constructive 45 degree mirror. The hologram optical element is then integrated with the laser diode in a plastic molded flat package.

The laser diode hologram is constructed on an Si photodetector substrate with an essential part of the manufacture of this assembly being the 45 degree micromirror constructed on the substrate to reflect the emitted laser beam from the laser diode. The laser diode emits the laser beam onto the 45 degree micromirror and is reflected perpendicular to the substrate. The construction of the micromirror on the Si substrate is critical to the function of the laser diode hologram. The laser diode is mounted on the hollow surface of the Si substrate resulting in a flat and compact assembly. The laser diode and the photodetectors can be combined optically, mediated by the micromirror and the holographic optical element. In this configuration, it is possible to mount a pair of photodetectors at both the right and left side of the laser diode.

The laser diode hologram unit utilizes the spot size detection method to focus the laser beam utilizing a servo mechanism. The laser beam emitted from the edge emitting diode laser is reflected from the micromirror perpendicular to the Si photodetector substrate. The laser beam passes through a grating pattern on the hologram optical element which splits the main laser beam into three beams passing through the lower surface of the hologram optical element. The three beams are focused on the compact disk by the focusing objective lens. Each reflected beam from the compact disk reflective surface is detected on a pair of photodetectors. Each photodetector has five elements to detect the signals. These signals are used by the optical head mechanism to focus the signals such as the FES, a focusing error signal, the TES, a tracking error signal, and the RFS, which is the data signal. These various signals for focus and tracking corrections are described mathematically as follows:

FES=[1+3+5]−[2+4+6]

TES=[T1−T2]+[T3−T4]

RFS=[1+3+5]+[2+4+6]

The essential factor in the production of the laser diode hologram is the correct fabrication of the micromirror with an optical flat surface on the Si substrate. The method to obtain the correct 45 degree angle on the silicon substrate is to etch the angle on the silicon substrate. The cross section of an anisotropic etched Si substrate has a <111> flat surface with an angle from the <100> surface of 54 degrees. In a two step process, by chemical etching an Si substrate with the <100> surface already declining by 9 degrees toward the <110> plane the anisotropic etching will result in a 45 degree surface required for the proper reflection of the laser beam. In manufacturing the micromirror the top corner of the laser chip is eliminated.

To realize a thin, small, pocket sized compact disk player, the optical pick up head of the disk player must be miniaturized. A conventional optical pickup head includes many components, thereby requiring a large assembly. The edge emitting laser diode and hologram unit has made it possible to miniaturize the optical pickup head. However, the design of this unit requires a micromirror constructed on the Si photodetector substrate to divert the laser beam in a direction perpendicular to the substrate. The construction of the micromirror involves a manufacturing process which is costly and work intensive.

The foregoing means, including the conventional optical reproducing pickup head and the substrate mounted edge emitting laser hologram pickup head, adequately provide for the pickup and reproduction of information stored on a surface medium. However, the arrangement has not proven to be entirely satisfactory. For example, the conventional pickup head includes too many discrete components for miniaturization. The edge emitting laser hologram pickup head requires extensive etching work of the silicon substrate to produce a micromirror.

It would be highly advantageous, therefore, to remedy the foregoing and other deficiencies inherent in the prior art.

Accordingly, it is an object of the present invention to provide improvements in optical reproducing pickup heads.

Another object of the invention is the provision of improvements especially adapted for use in the tracking system of an optical pickup head.

And another object of the invention is to provide improved means for the edge emitting laser hologram optical reproducing head.

Still another object of the immediate invention is the provision of improved means for the tracking system of a vertical cavity laser hologram optical pickup head.

A further object of the instant invention is to provide a simplified optical pickup head having relatively few components.

And a further object of this invention is to provide an optical pickup head which can be miniaturized.

And yet a further object of the invention is the provision of means and improvements according to the foregoing which will materially reduce the cost of an optical pickup head.

SUMMARY OF THE INVENTION

Briefly, to achieve the desired objects of the instant invention in accordance with a preferred embodiment thereof, provided is an optical pick-up head for reading information from a data storage medium. The pick-up head includes a vertical cavity surface emitting laser (VCSEL) for emitting a beam of light, focusing means for directing the beam of light onto the data storage medium, light receiving means for receiving light reflected from the data storage medium and tracking means.

In a more specific embodiment, the tracking means includes a beam splitter positioned intermediate the VCSEL and the focusing means. The focusing means includes a quarter wavelength plate and a focusing lens positioned in series along the path of the beam. The light receiving means includes a plurality of photodetectors for receiving light from the data storage medium.

In accordance with another embodiment, an optical pick-up head further includes a substrate, the substrate having a recess for receiving the VCSEL and comprising the photodetectors. The photodetectors include a plurality of photodiodes formed in the substrate and the focusing means includes a hologram positioned in the path of the beam.

In accordance with still a more specific embodiment of an optical pick-up head, the tracking means includes a first tracking VCSEL and a second tracking VCSEL positioned to opposing sides of the VCSEL for emitting beams of light generally parallel to the beam emitted by the VCSEL.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 3 is an isometric view of an edge emitting laser diode mounted on a silicon substrate;

FIG. 4 is a sectional view taken along the line 4—4 of FIG. 3 illustrating the laser beam reflection from a 45 degree micromirror formed on the silicon substrate;

FIG. 7 is a sectional view taken along line 7—7 of FIG. 6 illustrating the vertical cavity surface emitting laser mounted on the silicon substrate according to the present invention;

DESCRIPTION OF THE PREFERRED EMBODIMENTS

Figure 1:
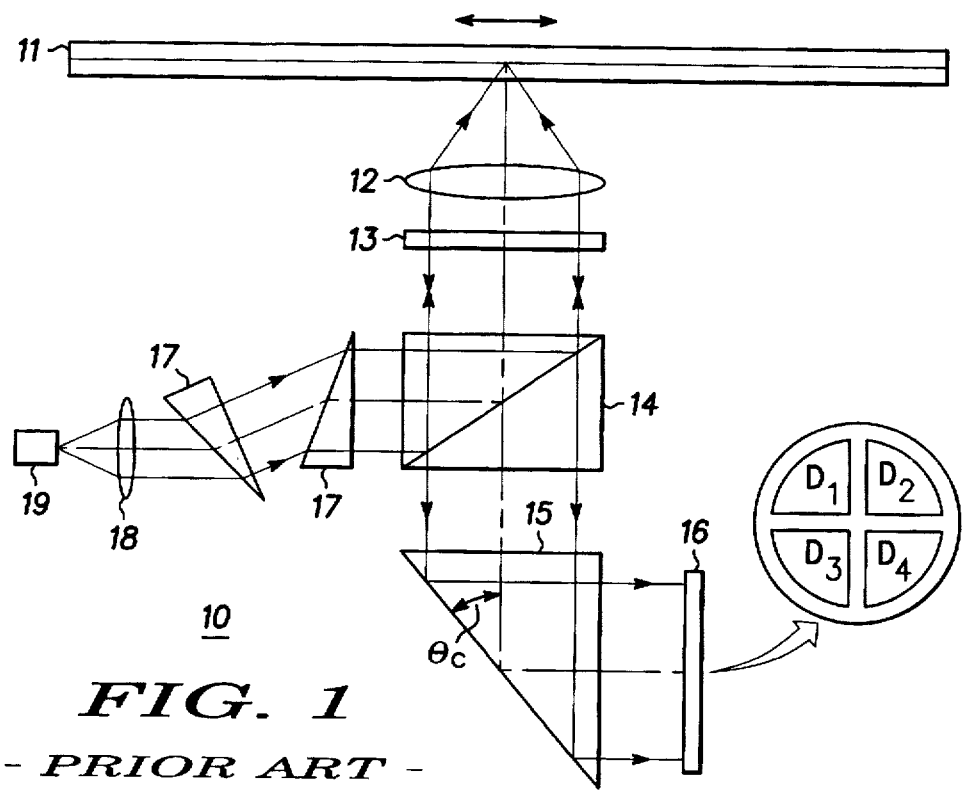
FIG. 1 is a schematic simplified drawing which illustrates a conventional optical pick up head using an edge emitting laser with collimating lens and beam shaping prisms.

Turning now to the drawings in which like reference characters indicate corresponding elements throughout the several views, attention is first directed to FIG. 1 which illustrates a conventional edge emitting laser optical pick up head 10. An edge emitting diode laser 19 emits a laser beam along a path which passes through a collimating lens 18 and prisms 17 for beam shaping. The laser beam is then reflected by a polarization beam splitter 14 onto a quarter wavelength plate 13 which further changes the laser beam's polarization and is focused on a data storage media, such as a surface of a compact disk 11, by objective lens 12. The laser beam is reflected from compact disk 11 and passes through quarter wavelength plate 13, which further changes the laser beam's polarization. The laser beam is reflected by a critical angle prism 15 which changes the beam's direction at right angles to the projected beam. The light is then directed onto an array of photodiodes. The changes in light intensity through the conductivity mechanism of the photodiodes on a quadrant photodetector plate 16 informs the system of the transition from a pit to a land and vice versa. This describes the mechanism of edge emitting diode laser optical pickup head 10 in a conventional configuration. The laser beam is a diverging beam having anisotropic diverging angles. The diverging beam from laser diode 19 is a linearly polarized laser beam which falls on collimator lens 18 where it is converted into a beam of substantially parallel rays of light which are then directed onto beam shaping prisms 17 for the shaping of the laser beam. The laser beam is then directed onto polarized beam splitter 14. Then the linearly polarized laser beam from beam splitter 14 impinges on quarter wavelength plate 13 where the laser beam is then converted into a circularly polarized laser beam which then falls on objective focus lens 12. The beam passed through objective lens 12 is a focused beam having a substantially circular cross sectional shape and is then focused on compact disk 11 having a spot of approximately one micrometer in diameter.

On compact disk 11 the information is coded by lands and pits imprinted on the disk surface, which either reflect the focused laser beam or scatter the beam for the recording of the information stored on the disk surface. The reflected beam from the disk surface passes through objective lens 12 to strike quarter wavelength plate 13 and is thereby converted from a circular polarized beam back to a linearly polarized beam. The converted beam from quarter wavelength plate 13 is reflected by beam splitter 14 to strike critical angle prism 15 and deflected onto quadrant photodetector 16 to derive the data signal.

Quadrant photodetector 16 consists of four photo detecting elements which have identical dimensions. A spot of the incident beam supplied to quadrant photodetector 16 is varied in shape from an ellipse through a true or perfect circle to another ellipse by operation of focus lens 12. The focus is adjusted by utilizing the sum signals from photodetectors $D_1$ and $D_2$ and subtracting the sum of signals from photodetectors $D_3$ and $D_4$. Focus lens 12 is then adjusted by utilizing the difference between the sum of reproduced signals at two opposing photo detecting elements arranged on one hemisphere of the quadrant as opposed to the second by the summation of signals from either side. The focus error signal is adapted to the control apparatus which moves the objective focus lens.

A tracking error signal can also be obtained by utilizing the difference between the sum of reproduced signals at two photo detecting elements of the right side as denoted by the sum of photodetectors $D_1$ and $D_3$ as the sum of the left side and the sum of photodetectors $D_2$ and $D_4$ as the sum of the right side. The focus error is the difference of summation of signals from the left to the right side. This tracking error signal is adapted to control the objective focus lens or the whole optical system to provide a zero signal from the difference in photodetector signals from the left and right sides of quadrant photodetector 16.

Figure 2:
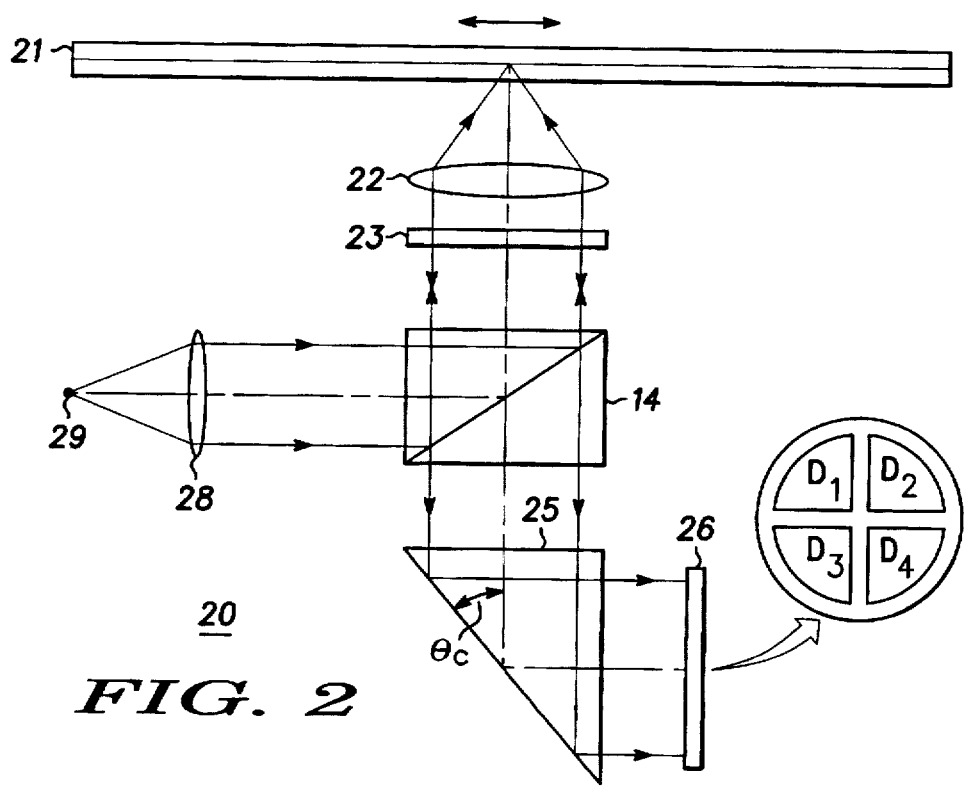
FIG. 2 is a schematic simplified drawing which illustrates an embodiment of an optical pick up head constructed in accordance with the teachings of the present invention.

FIG. 2 illustrates an embodiment of a VCSEL optical pick up head generally designated 20. A vertical surface emitting laser 29 emits a laser beam along a path which passes through a collimating lens 28. The laser beam is then reflected by a polarization beam splitter 24 onto a quarter wavelength plate 23 which further changes the laser beam's polarization and is focused on a surface of a compact disk 21 by an objective lens 22. It will be readily understood by one skilled in the art that any data storage media which employs lasers for reading, may be read by the present invention. The laser beam is reflected from compact disk 21 and passes through quarter wavelength plate 23, which further changes the laser beam's polarization. The laser beam is reflected by a critical angle prism 25 which changes the beam's direction at right angles to the projected beam. The light is then focused by a cylindrical lens onto an array of photodiodes. The changes in light intensity through the conductivity mechanism of the photodiodes on a quadrant photodetector 26 informs the system of the transition from a pit to a land and vice versa. This describes the mechanism of the VCSEL optical pickup head 20 constructed in accordance with the teachings of the present invention.

The laser beam from VCSEL 29 is passed through collimating lens 28 and is then directed onto polarized beam splitter 24. Then the linearly polarized laser beam from beam splitter 24 impinges on quarter wavelength plate 23 where the laser beam then passes through objective lens 22. The focused beam has a substantially circular cross sectional shape which is then focused on compact disk 21 having a spot of approximately one micrometer in diameter.

On compact disk 21, the information is coded by lands and pits imprinted on the disk surface which either reflect the focused laser beam or scatter the beam for the recording of the information stored on the disk surface. The reflected beam from the disk surface passes through objective lens 22 to strike quarter wavelength plate 23 and is thereby converted from a circularly polarized beam back to a linearly polarized beam. The converted beam from quarter wavelength plate 23 is reflected by beam splitter 24 to strike critical angle prism 25 and deflected onto quadrant photodetector 26 to derive the data signal.

Quadrant photodetector 26 consists of four photo detecting elements which have identical dimensions. A spot of the incident beam supplied to quadrant photodetector 26 is varied in shape from an ellipse through a true or perfect circle to another ellipse by operation of focus lens 22. The focus is adjusted by utilizing the sum signals from photodetectors $D_1$ and $D_2$ and subtracting the sum of signals from photodetectors $D_3$ and $D_4$. Focus lens 22 is then adjusted by utilizing the difference between the sum of reproduced signals at two opposing photo detecting elements arranged on one hemisphere of the quadrant as opposed to the second by the summation of signals from either side. The focus error signal is adapted to the control apparatus which moves objective focus lens 22.

A tracking error signal can also be obtained by utilizing the difference between the sum of reproduced signals at two photo detecting elements of the right side as denoted by the sum of photodetectors $D_1$ and $D_3$ as the sum of the left side and the sum of photodetectors $D_2$ and $D_4$ as the sum of the right side. The focus error is the difference of summation of signals from the left to the right side. This tracking error signal is adapted to control objective focus lens 22 or the whole optical system to provide a zero signal from the difference in photodetector signals from the left and right sides of quadrant photodetector 26.

VCSEL optical pick up head 20 improves conventional edge emitting laser optical head 10 by incorporating vertical cavity surface emitting laser 29 which does not require prisms 17 used in conventional edge emitting diode laser 19.

The laser beam emitted by vertical cavity surface emitting laser 29 is of good quality and does not require beam shaping prisms 17.

The basis for VCSEL 29 in virtually all configurations is an active area sandwiched between two mirror stacks. To activate VCSEL 29, it is necessary to drive current through the mirror stacks and the active area. This is generally accomplished by placing a first electrode across the mirror stack at one end of the laser and a second electrode across the mirror stack at the other end of the laser. One of the electrodes generally defines a central opening for the emission of light.

An improvement to conventional optical pick up head 10 is the hologram laser unit which allows for a reduction of discrete components which make up the optical pick up head. FIG. 3 illustrates further improvements which were obtained in the miniaturization of a portion 30 of an optical pick up head by constructing an edge emitting laser diode unit 32 on a silicon photodetector substrate 31 with a constructive 45 degree angle micromirror 34 which reflects the laser beam from edge emitting diode 32 into a beam perpendicular to substrate 31. In this configuration it is possible to form two photodetector elements 33 on silicon substrate 31. Laser diode 32 is constructed on silicon photodetector substrate 31. An essential part of the manufacture of this assembly is 45 degree micromirror 34 constructed on substrate 31 to reflect the emitted laser beam as shown in FIG. 4. Edge emitting diode laser 32 emits the laser beam towards 45 degree micromirror 34 etched on silicon substrate 31. The essential factor in the production of portion 30 is the correct fabrication of micromirror 34 with an optically flat surface on silicon substrate 31. The method to obtain the correct 45 degree angle on silicon substrate 31 is to etch an angle on silicon substrate 31. The cross section of an anisotropically etched silicon substrate has a <111> flat surface with an angle from the <100> surface of 54 degrees. In a two step process, by chemical etching a silicon substrate with the <100> surface already declining by 9 degrees toward the <110> plane the anisotropic etching will result in a 45 degree surface required for the proper reflection of the laser beam. To further explain the manufacturing details in forming micromirror 34 the top corner of the laser chip is eliminated.

Figure 5:
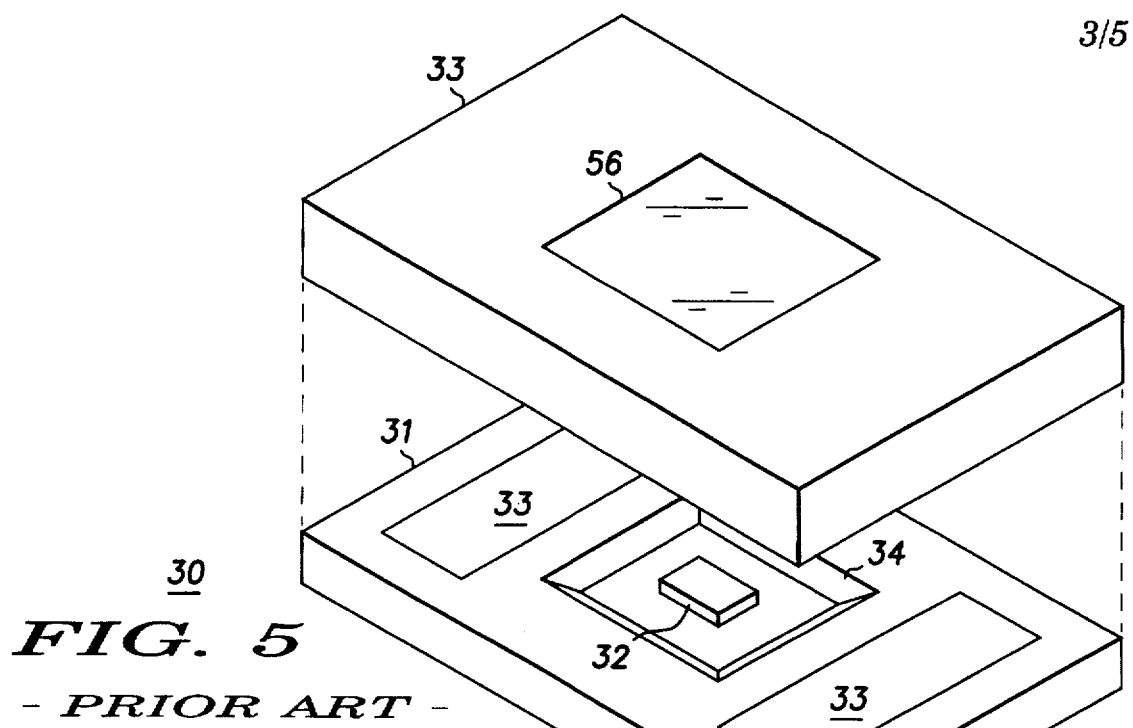
FIG. 5 is a composite an isometric view of the edge emitting laser diode unit corresponding to the view of FIG. 3 illustrating a holographic optical element.

A further improvement to conventional optical pick up head 10 is inclusion of a hologram optical element 55 to complete an edge emitting diode laser hologram optical pick up head 50 as illustrated in FIG. 5 which allows for a reduction of discrete components which make up optical pick up head 10. Edge emitting diode laser hologram optical pick up head 50 consists of hologram optical element 55 with edge emitting diode laser 32, 45 degree reflective micromirror 34 etched on silicon photodetector substrate 31 which reflects the laser beam through a hologram surface 56 of hologram optical element 55.

Figure 6:
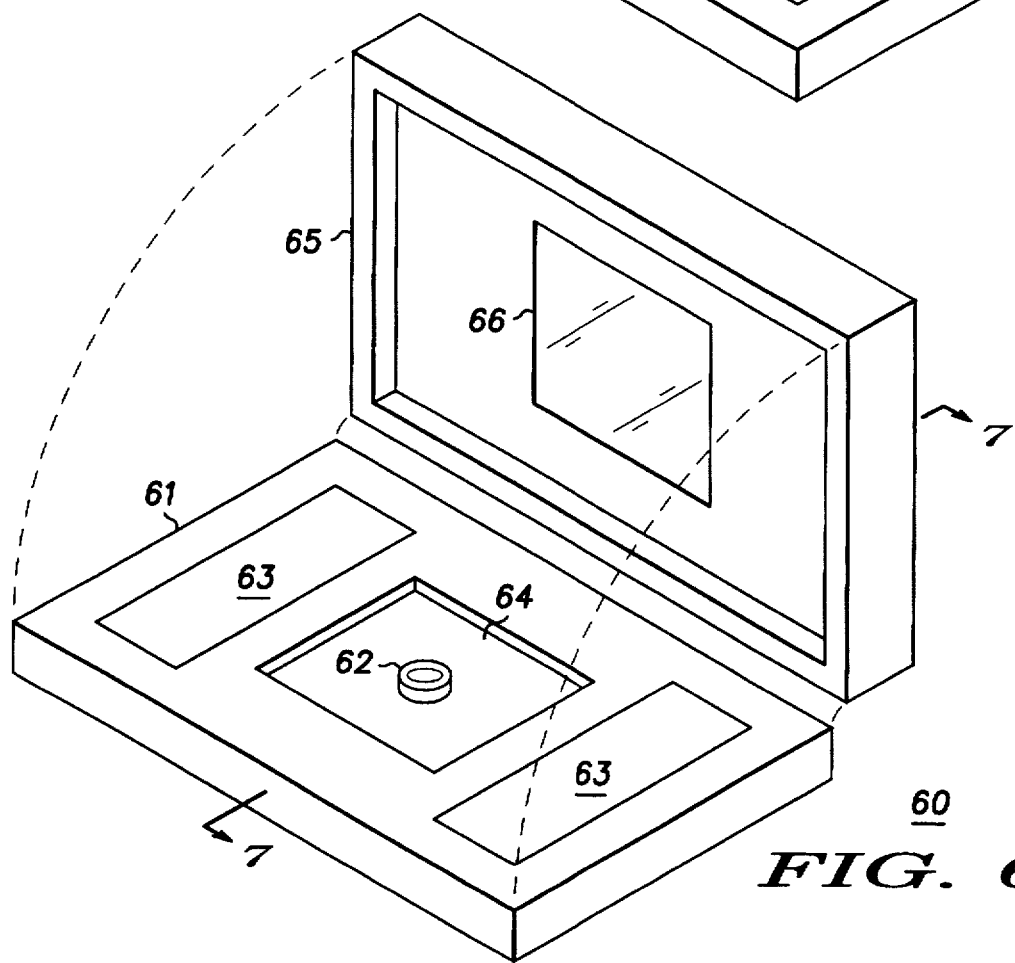
FIG. 6 is a composite an isometric view of another embodiment of an optical pick up head constructed in accordance with the teachings of the present invention.

FIG. 6 illustrates another embodiment of a vertical cavity surface emitting laser optical pickup head generally designated 60, constructed in accordance with teachings of the instant invention. Optical pick up head 60 includes a VCSEL 62 which emits a laser beam along a path, and is carried on a semiconductor substrate 61, within a recess 64. Pick up head 60 further includes a hologram optical element 65 with grating 66 which splits the main laser beam generally into three separate parts. It should be understood that hologram element 65 performs in a similar manner to a lens and a ¼ wavelength plate since the hologram area integrally includes a lens element for focusing and a plate element for altering the polarization of the beam. The split beam is reflected onto photodetectors 63 which are comprised of five elements each, each element being a photodetector. The elements may be substantially any well known photodetector, but preferably consist of photodiodes.

Referring to FIG. 7 vertical cavity surface emitting laser 62 is illustrated mounted on semiconductor substrate 61 and further illustrated is the perpendicular laser beam emitted from VCSEL 62.

Figure 8:
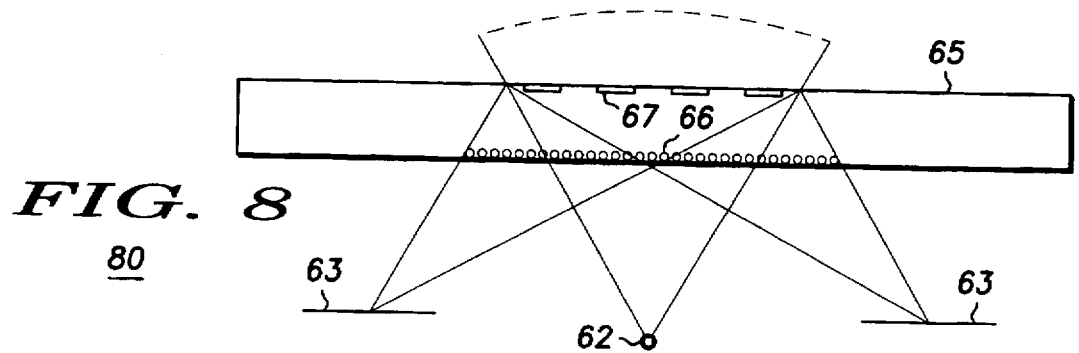
FIG. 8 is a simplified schematic diagram of a holographic optical unit illustrating a grating which splits a main laser beam into three beams, a main beam and two side beams for tracking error correction.

Holographic optical element 65 is illustrated in FIG. 8 where vertical cavity surface emitting laser 62 emits a laser beam perpendicular to substrate 61 and through grating 66 on the lower surface of holographic optical element 65. The laser beam is polarized by element 65 and focused by a holographic area 67 on the top surface of holographic optical element 65.

Figure 9:
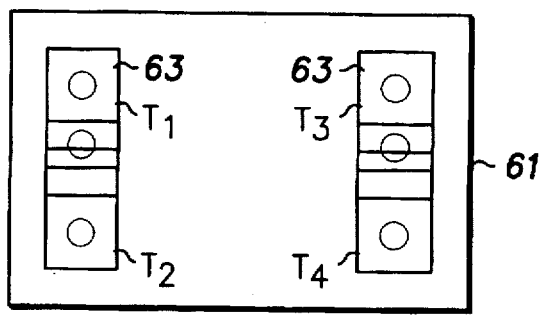
FIG. 9 is a top view of the silicon substrate of FIG. 6 illustrating the vertical cavity surface emitting laser and two photodetectors of five elements each according to the present invention.
Figure 10:
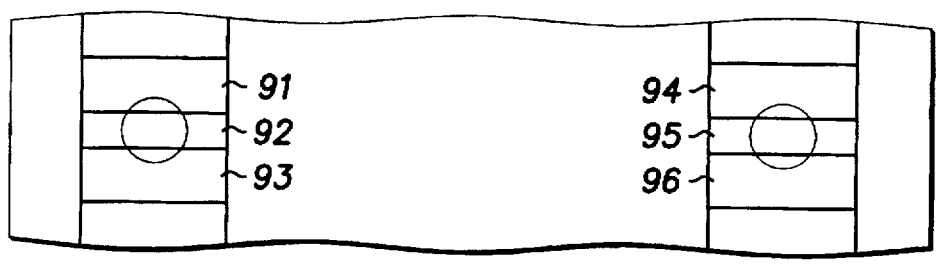
FIGS. 10–12 are partial views of FIG. 9 illustrating the central elements of the photodetectors and the operation thereof.
Figure 11:
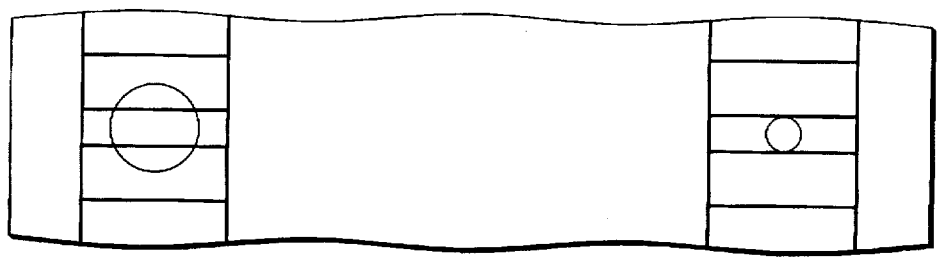
Figure 12:
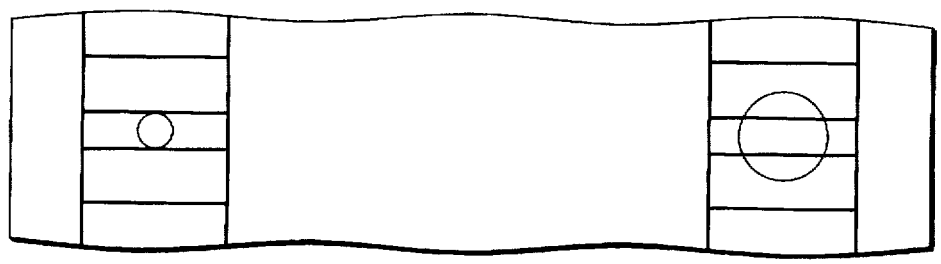

Referring to FIG. 9, substrate 61 is illustrated and contains two photodetectors 63 comprised of 5 elements each. With further reference to FIGS. 10, 11, and 12, the three intermediate elements of the left hand photodetector 63 are noted separately as elements 91, 92, and 93 and in the opposite photodetector 63 denoted as elements 94, 95, and 96. FIGS. 10–12 illustrate the possible focusing logic for focus error correction. In this configuration, a pair of photodetectors 63 at both the right and left side of VCSEL 62 comprised of five photodetector elements each, correct for focus and tracking errors as noted herein.

Pick up head 60 utilizes the spot size detection method to focus the laser beam utilizing a servo mechanism. The laser beam emitted from vertical cavity surface emitting laser 62 is perpendicular to substrate 61. The laser beam passes through grating pattern 66 on hologram optical element 65 which splits the main laser beam into three beams passing through the lower surface of hologram optical element 65. The three beams are focused on the compact disk by hologram area 67. Each reflected beam from the compact disk reflective surface is detected on the pair of photodetectors 63. These signals are used by an optical head mechanism to focus the signals such as the FES, a focusing error signal, the TES, a tracking error signal, and the RFS, which is the data signal. These various signals for focus and tracking corrections are described mathematically as follows:

$$FES=[91+93+95]-[92+94+96]$$

$$TES=[T1-T2]+[T3-T4]$$

$$RFS=[91+93+95]+[92+94+96]$$

The elements noted as T1 and T2 are the top photodetector element and bottom photodetector element respectively of five element photodetector 63 on the left side of substrate 61 illustrated in FIG. 9. The elements noted as T3 and T4 are the top photodetector element and bottom photodetector element respectively of five element photodetector 63 on the right side of silicon substrate 61.

Figure 13:
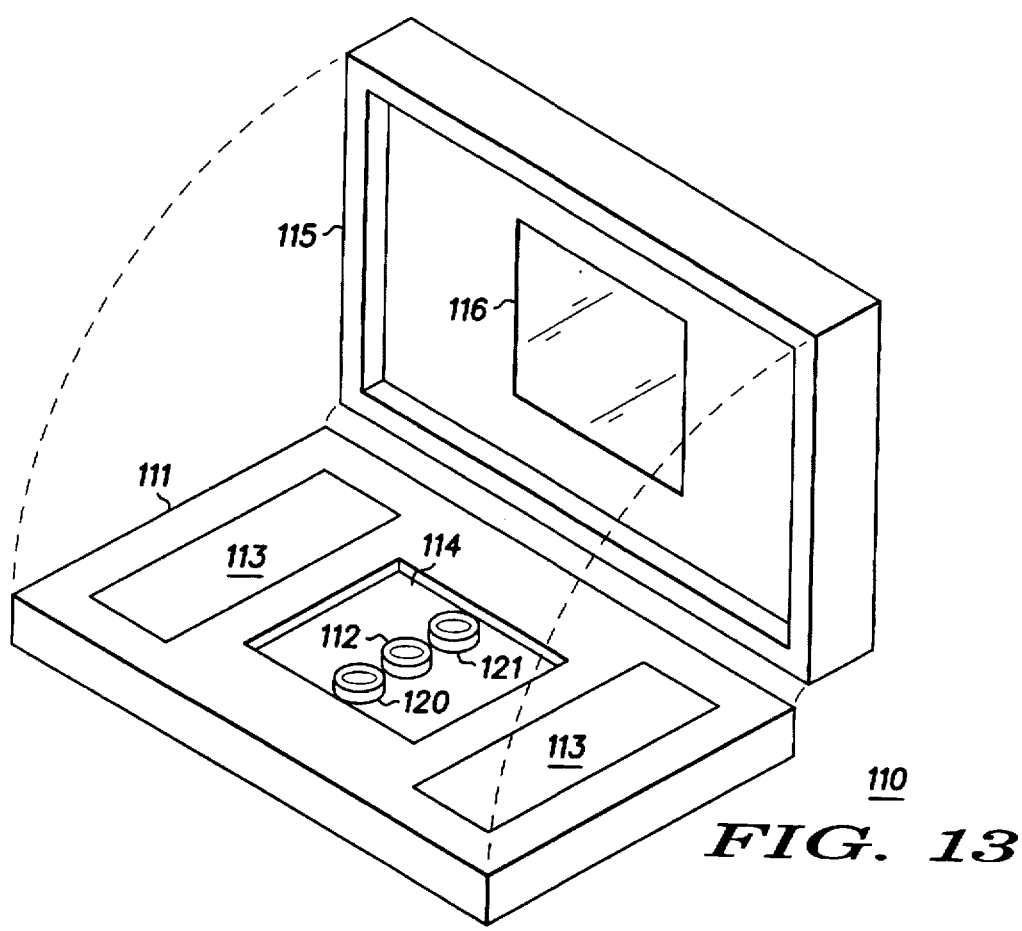
FIG. 13 is a composite isometric view of another embodiment of an optical pick up head constructed in accordance with the teachings of the present invention.

Referring to FIG. 13, yet another embodiment of a VCSEL optical pick up head generally designated 110 is illustrated. VCSEL optical pickup head 110 is generally similar to pick up head 60, including a VCSEL 112 which emits a laser beam along a path, and is carried on a semiconductor substrate 111 within a recess 114, a hologram optical element 115 having a hologram area 116 and photodetectors 113 which are comprised of five elements each and formed in substrate 111 to either side of recess 114. As in the previous embodiment, each element is a photodetector. The elements may be substantially any well known photodetector, but preferably consist of photodiodes.

Pick up head 110 differs from pick up head 60 in that it includes a different mechanism to detect tracking errors than utilizing a diffraction grating 66 which splits the laser beam into three parts. In this embodiment, tracking VCSELs 120 and 121 are carried within recess 114 on opposing sides of VCSEL 112, and emit tracking beams which are detected by photodetectors 113. The three VCSEL array allows further miniaturization of optical pickup head 110 since holographic optical element 115 does not require grating 66 for beam splitting. The laser beam becomes a main tracking beam with two beams which are focused on the left and right sides of the track to keep the major beam on center.

Figure 14:
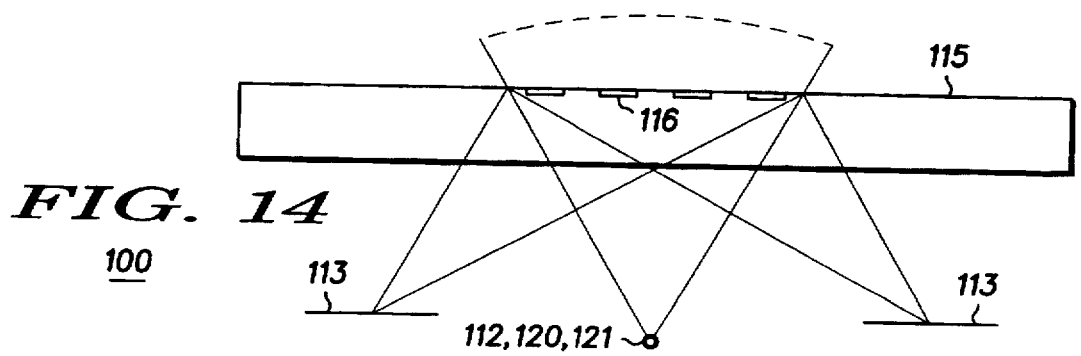
FIG. 14 is a simplified schematic diagram of the embodiment of FIG. 13.

FIG. 14 illustrates holographic optical element 115 with hologram area 116 upon which are impinged three laser beams from VCSEL 112 and tracking VCSELs 120 and 121, to correct for tracking errors as noted herein.

The compact disk surface reflects the side beams along with the major tracking beam. Photodetectors 113 are used to detect the tracking error. When the side beams are not of equal intensity, the system activates a servomechanism which moves the optical head to correct the tracking error. The reflected light is not always of uniform and equal distribution on photodetector 113. This change in light intensity allows for focus and tracking adjustments. By calculating the differences between the sums of light intensity in different pairs of photodetectors, the system can compensate for focus and tracking errors.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An optical pick-up head for reading information from a data storage medium, the pick-up head comprising:

a vertical cavity surface emitting laser for emitting a beam of light along a path;

focusing means for directing the beam of light onto the data storage medium including a quarter wavelength plate and a hologram area formed in an integrated optical element and positioned in series along the path of the beam;

light receiving means including a plurality of photodetectors for receiving light reflected from the data storage medium;

tracking means for positioning of the beam of light including a beam splitter having an optical grating positioned along the path of the beam and formed in the integrated optical element; and the plurality of photodetectors being connected to provide the following output signals $FES=(91+93+95)-(92+94+96)$ $TES=(T1-T2)+(T3-T4)$ $RFS=(91+93+95)+(92+94+96)$ where:
   FES is a focusing error signal,
   TES is a tracking error signal,
   RFS, is a data signal, and
   T1–T4 and 91–96 are photodetectors.

2. An optical pick up head for reading information from a data storage medium, the pick up head comprising:

a vertical cavity surface emitting laser for emitting a beam of light along a path;

a semiconductor substrate carrying the vertical cavity surface emitting laser;

focusing means for directing the beam of light onto the data storage medium, the focusing means including a hologram area positioned in the path of the beam;

light receiving means including a plurality of photodetectors formed in the semiconductor substrate for receiving light reflected from the data storage medium;

tracking means for positioning of the beam of light, the tracking means including a grating positioned adjacent the hologram area in the path of the beam; and the plurality of photodetectors being connected to provide the following output signals $FES=(91+93+95)-(92+94+96)$ $TES=(T1-T2)+(T3-T4)$ $RFS=(91+93+95)+(92+94+96)$ where:
   FES is a focusing error signal,
   TES is a tracking error signal,
   RFS, is a data signal, and
   T1–T4 and 91–96 are photodetectors.

3. An optical pick up head for reading information from a data storage medium, the pick up head comprising:

a vertical cavity surface emitting laser for emitting a beam of light along a path;

a lens element for focusing the beam of light including a hologram area and a plate element for altering the polarization of the beam of light formed in an integrated optical element positioned in the path of the beam of light;

an array of photodiodes for receiving the reflected beam of light;

tracking means for positioning of the beam of light, the tracking means including a beam splitter positioned along the path of the beam; and the array of photodiodes being connected to provide the following output signals $FES=(91+93+95)-(92+94+96)$ $TES=(T1-T2)+(T3-T4)$ $RFS=(91+93+95)+(92+94+96)$ where:
   FES is a focusing error signal,
   TES is a tracking error signal,
   RFS, is a data signal, and
   T1–T4 and 91–96 are photodiodes of the array of photodiodes.

* * * * *